(12) United States Patent
Thaler

(10) Patent No.: US 10,484,287 B2
(45) Date of Patent: Nov. 19, 2019

(54) SUPPORT FOR DISTINGUISHED MINIMUM LATENCY TRAFFIC GUARD BAND

(71) Applicant: AVAGO TECHNOLOGIES INTERNATIONAL SALES PTE. LIMITED

(72) Inventor: Patricia Ann Thaler, Carmichael, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 582 days.

(21) Appl. No.: 14/278,189

(22) Filed: May 15, 2014

(65) Prior Publication Data

US 2014/0341032 A1  Nov. 20, 2014

Related U.S. Application Data

(60) Provisional application No. 61/823,704, filed on May 15, 2013.

(51) Int. Cl.
*H04L 12/851* (2013.01)

(52) U.S. Cl.
CPC ........ *H04L 47/2433* (2013.01); *H04L 47/245* (2013.01)

(58) Field of Classification Search
None
See application file for complete search history.

(56) References Cited

U.S. PATENT DOCUMENTS

| | | | |
|---|---|---|---|
| 2002/0041595 A1* | 4/2002 | Delvaux | H04L 47/10 370/392 |
| 2003/0043736 A1* | 3/2003 | Gonda | H04J 3/14 370/218 |
| 2003/0135667 A1* | 7/2003 | Mann | H04L 47/10 710/5 |
| 2004/0184481 A1* | 9/2004 | Lee | H04L 47/14 370/469 |
| 2005/0254423 A1* | 11/2005 | Berghoff | H04L 47/10 370/230.1 |
| 2008/0019309 A1* | 1/2008 | Kwun | H04L 5/0053 370/329 |
| 2009/0049223 A1* | 2/2009 | Simkins | H04L 47/10 710/305 |

(Continued)

*Primary Examiner* — Adnan Baig
(74) *Attorney, Agent, or Firm* — Xsensus LLP

(57) ABSTRACT

A network device may implement a guard band for reducing latency of transmitting high priority data. The device may identify a scheduled communication time for high priority data, which may include a scheduled reception time of the high priority data by the network device or a scheduled communication time of the high priority data. The network device may initiate a guard band prior to the scheduled communication time, and even before the high priority data is received by the network device. When the guard band is active, the network device may prevent transmission of low priority data, which may include preempting an in-progress low priority packet when initiating the guard band. Upon receiving the high priority data, the network device may immediately transmit the high priority data without incurring additional latency for preempting a low priority packet.

20 Claims, 5 Drawing Sheets

(56) References Cited

U.S. PATENT DOCUMENTS

2009/0081962 A1* 3/2009 Sohrabi ............. H04W 72/1242
455/79
2011/0261814 A1* 10/2011 Matthews ............... H04L 47/28
370/389
2015/0372931 A1* 12/2015 Puleri ................ H04Q 11/0066
398/47

* cited by examiner

SUPPORT FOR DISTINGUISHED MINIMUM LATENCY TRAFFIC GUARD BAND

PRIORITY CLAIM

This application claims priority to provisional application Ser. No. 61/823,704, filed 15 May 2013, which is entirely incorporated by reference.

TECHNICAL FIELD

This disclosure relates to communicating data. This disclosure also relates to providing a guard band for decreasing transmission latency for high priority data.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in networking devices will further enhance the performance of data networks.

DETAILED DESCRIPTION

In communication networks, a prioritized (e.g., minimum) latency for transmitting data may have a lower bound according to the time to transmit a packet, such as a largest permitted Ethernet frame. A prioritized latency scenario may occur when a high priority (e.g., urgent) packet requiring low latency arrives immediately after a maximum size low priority (e.g., non-urgent) packet has begun transmission. Packet preemption may allow the high priority packet to interrupt transmission of a low priority packet. Further techniques may be employed to decrease the latency for transmitting the high priority packet, including providing a guard band as discussed below.

The discussion below presents methods, devices, systems, implementations, and techniques for providing a guard band to support transmission of high priority data. A device may provide a guard band by preempting a low priority packet in different ways. The preemption may occur prior to communicating, sending, receiving, processing, handling, or generating high priority traffic. In doing so, the guard band may decrease the transmission latency for sending the high priority packet. For example, a device may provide a guard band by preempting the transmission of other low priority traffic before scheduled high priority traffic arrives at the device. Then, when the scheduled high priority traffic arrives, the device may transmit the scheduled traffic immediately without having to wait for completing preemption of transmitting in-progress low priority traffic. While the descriptors 'high priority' and 'low priority' are sometimes used for explanatory purposes, the guard band support described herein may apply to any pre-determined priority levels to help higher priority traffic achieve low latency by preemption of relatively lower priority traffic. There may be any number of priority levels assigned to packets, e.g., five levels, and, for instance, any higher priority level traffic may pre-empt any lower priority level traffic to help achieve improved latency for higher priority traffic.

Figure 1:
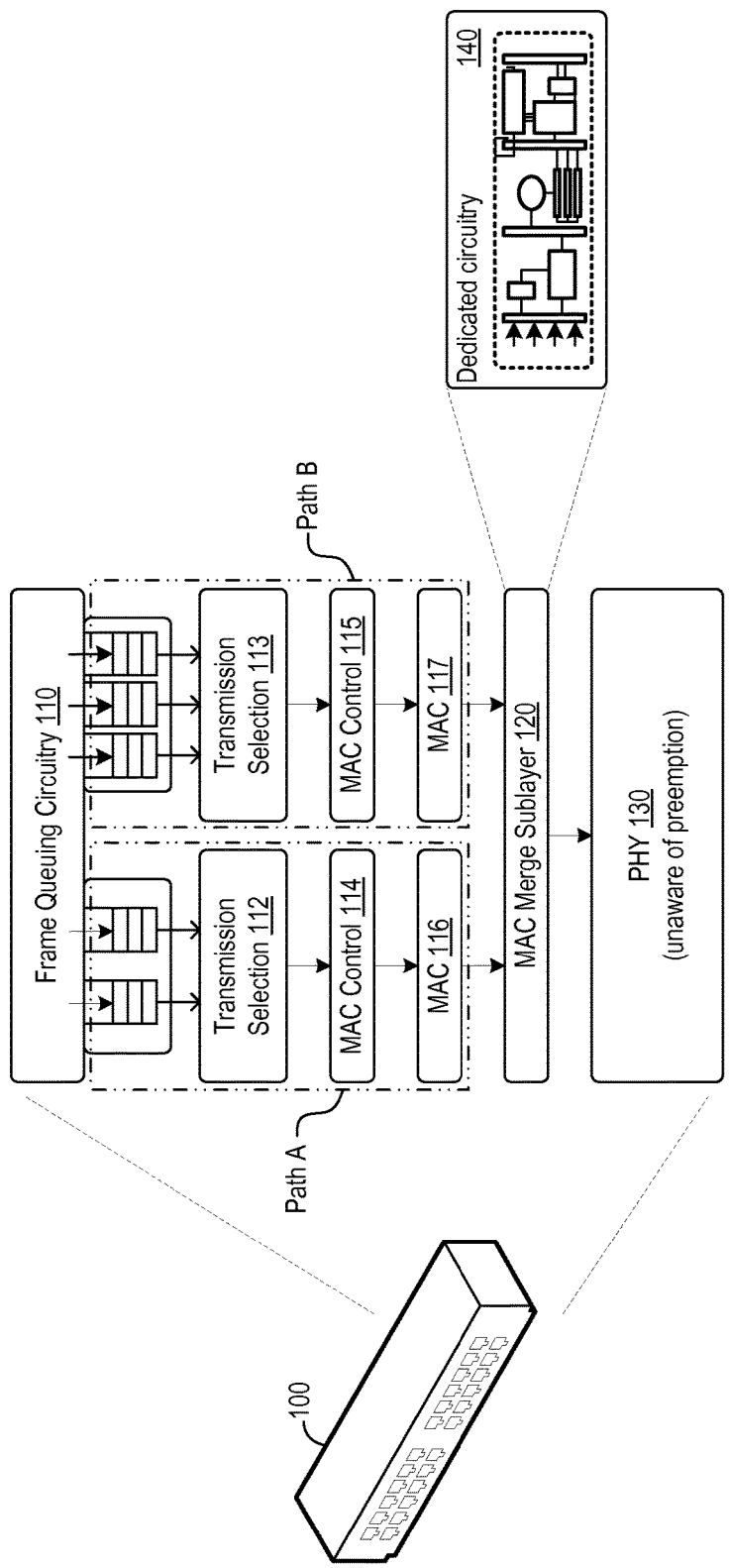
FIG. 1 shows an example of a device that may support a guard band for high priority data.

FIG. 1 shows an example of a device 100 that may support a guard band for high priority data. The device 100 may be any device capable of communicating data. The device 100 may communicate data according to any number of wired or wireless communication formats, protocols, modulations, standards, frequency channels, bit rates, and encodings. Thus, the device 100 may support communication using Ethernet, cable such as Data Over Cable Service Interface Specification (DOCSIS), Digital Subscriber Line (DSL), Multimedia over Coax Alliance (MoCA), power line (e.g. HomePlug AV), Ethernet Passive Optical Network (EPON), Gigabit Passive Optical Network (GPON), Integrated Services Digital Network (ISDN), Fiber Distributed Data Interface (FDDI), the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), and others. As examples, the device 100 may be a switch, hub, router, gateway, network bridge, or any other type of network device that processes or routes network data such as packets. The device 100 may be any electronic device that communicates data, such as desktop and laptop computers, mobile phones, personal data assistants, pocket computers, tablet computers, portable email devices, or may be processes or threads executed in memory by a processor.

As additional examples, the device 100 may include elements or components of any system, such as an automobile, vehicle, airplane, electric generator, wind turbine, electrical grid system, traffic monitoring systems, industrial systems, a manufacturing line, robotic machinery, medical imaging device, automotive control systems, and countless other systems and devices. The device 100 may be a sensor that measures environment conditions or intermediate network devices that transport sensor readings within a control system, e.g., within an industrial or automotive context. The device 100 may be any element or component within a communication system, and may support transfer of high priority data at a reduced or minimum latency through a guard band.

The device 100 implements circuitry to support data communication, e.g., in hardware, software, or both. The device 100 shown in FIG. 1 includes, as one particular implementation example, frame queuing circuitry 110, transmission selection circuitry 112 and 113, Media Access Control (MAC) control 114 and 115, MAC circuitry 116 and 117, a MAC merge sublayer 120, and a physical (PHY) layer 130. The frame queuing circuitry 110 may assign data, e.g., frames, to one or more queues for transmission, such as the queues 131-135 in FIG. 1. The queues 131-135 may be configured according to any number of parameters, and different queues may respectively store frames of different communication priority. The different circuitry in FIG. 1 may operate in or provide functionality corresponding to respective layers of the OSI model. For example, the MAC control 114 and MAC logic 116 may provide data link layer (layer 2) functionality.

The device 100 may implement particular processing paths differentiated according to any number of frame characteristics, one of which is priority. In FIG. 1, the device implements the two frame processing paths labeled as Path A and Path B in FIG. 1. A first path (e.g., Path A) may include any combination of transmission selection circuitry 112, MAC control 114, and MAC circuitry 116 for processing frames of a first priority and a second path (e.g., Path B) may include any combination of transmission selection circuitry 113, MAC control 115, and MAC circuitry 117 for processing frames of a second priority. In that regard, the different paths may include logically distinct circuitry, e.g., a respective MAC circuitry 116 and 117 for each path, though the distinct circuitry may be physically implemented in the same integrated circuit, chip, or die.

The device 100 may implement a MAC merge sublayer 120. In some implementations, the device 100 implements the MAC merge sublayer 120 in hardware as dedicated circuitry 140, e.g., circuitry dedicated to the MAC merge sublayer functionality described below. The dedicated circuitry 140 may implement a state machine, for example, that controls functionality of the MAC merge sublayer 120. The device 100 may support prioritized communication of high priority data. In that regard, the device 100 may support packet preemption through interrupting communication of lower priority packets to transmit a higher priority packet. For example, the device 100 may implement any of the circuitry, logic, functionality and techniques described in U.S. application Ser. No. 14/187,098, filed 21 Feb. 2014, which is entirely incorporated herein by reference. As discussed in greater detail below, the device 100 may implement a guard band to support reduced latency or immediate transfer of high priority data identified by the device 100. In some implementations, the device 100 identifies Distinguished Minimum Latency Traffic (DMLT) as high priority and non-DMLT as low priority.

Figure 2:
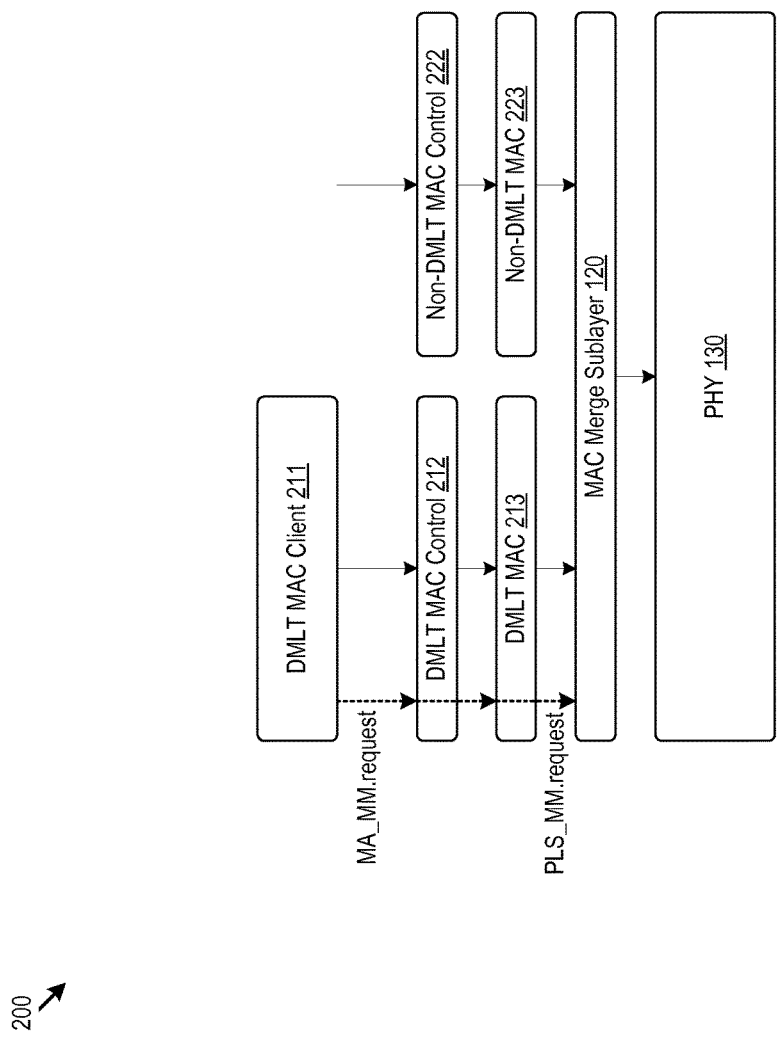
FIG. 2 shows an example of device circuitry for implementing support for a guard band.

FIG. 2 shows an example of device circuitry 200 for implementing support for a guard band. The device 100 may implement the device circuitry 200 in any combination of hardware, firmware, or software. In the example shown in FIG. 2, the device circuitry 200 includes the DMLT MAC client 211, the DMLT MAC control 212, the DMLT MAC circuitry 213, the non-DMLT MAC control 222, the non-DMLT MAC circuitry 223, the MAC merge sublayer 120, and the PHY 130.

The device circuitry 200 may include logic that schedules transmission of packet data, such as a MAC client 211 for example. A MAC client may include any logic at a higher level in the OSI model than the MAC sub-layer, such as the frame queuing logic 110 or the transmission selection logic 112 shown in FIG. 1. In FIG. 2, the device logic 200 includes the DMLT MAC client 211, which interfaces with the DMLT MAC control 212. The DMLT MAC client 211 may schedule transmission of a particular type of high priority data, such as DMLT.

The DMLT MAC client 211 may determine a communication schedule for traffic, such as scheduled DMLT. Scheduled traffic may refer to any packet data communicated accordingly to a predetermined schedule. Examples of scheduled traffic, such as scheduled DMLT, may include any number of communications in an industrial setting or control system, such as sensor readings, actuator communications, controller commands, or other time-sensitive communications within an industrial context. The DMLT MAC client 211 may support a guard band for any additional or alternative contexts for scheduled traffic.

The communication schedule may specify, as one example, periodic transmission of high priority data (e.g., sensor readings), and the communication schedule may specify a scheduled communication time for the high priority data. The communication schedule time may indicate a respective scheduled reception and/or transmission time of high priority data for one or more devices in a communication path or system, including intermediate devices or end point devices. The device 100 may identify high priority data according to any number of ways, e.g., via specific header data, data from a particular source or to be sent to a particular destination, data of a particular priority, traffic class, or in various other ways. The DMLT MAC client 211 may identify scheduled communication times for reception or transmission of high priority data by the device 100, or even for specific reception and transmission times for individual circuit or logic blocks within the device 100, such as the MAC merge sublayer 120, PHY 130, or any other component of the device 100.

The DMLT MAC client 211 may identify scheduled communication times for high priority data (e.g., DMLT packets) that the communication of (e.g., transmission, processing, or reception of) occurs in the future. In that regard, the DMLT MAC client 211 may identify a future scheduled communication time for transmitting a particular DMLT packet, even before the device 100 receives the particular DMLT packet from another originating or intermediate network device or generates the particular DMLT packet itself. In some variations, the DMLT MAC client 211 obtains the communication schedule for scheduled DMLT packets from a management device, such as a network manager or control device in communication with the device 100. Additionally or alternatively, the DMLT MAC client 211 may obtain the communication schedule through reservation protocol packets received by the device 100, and store the communication schedule in a memory of the device 100.

The DMLT MAC client 211 may initiate a guard band for scheduled high priority data based on the scheduled communication (e.g., reception or transmission) time of the scheduled high priority data. The guard band may provide reduced latency or immediate processing and transmission of the scheduled high priority data upon reception of the high priority data by the network device. As one exemplary aspect of a guard band, the device 100 (e.g., the DMLT MAC client 211 or MAC merge sublayer 120) may attempt or cause preemption of an in-progress communication of low priority (e.g., non-DMLT) traffic, and at a predetermined time prior to the scheduled communication time of the scheduled high priority data. As another exemplary aspect of a guard band, the device 100 may prevent or inhibit communication of low priority data after initiating the guard band and while the guard band is active. For instance, the device 100 may not allow communication of a low priority packet to start while the guard band is active. Accordingly, upon receiving the scheduled high priority data, the device 100 may transmit the scheduled high priority data immediately (assuming that another high priority packet is not undergoing transmission).

The MAC merge sublayer 120 may enforce the guard band by preempting or inhibiting communication of low priority data or traffic. In some implementations, the MAC merge sublayer 120 tracks whether a guard band is active or inactive through a parameter value, such as hold_req parameter accessible to the MAC merge sublayer 120 (e.g., in a shared memory) that takes different values. When the hold_req value is asserted (e.g., has a value of 1), the MAC merge sublayer 120 may determine that the guard band is active, during which the MAC merge sublayer 120 may preempt and prevent transmission of low priority data. When the hold_req value is cleared (e.g., has a value of 0), the MAC merge sublayer 120 may determine that the guard band is inactive, during which the MAC merge sublayer 120 may allow transmission of low priority data. The MAC merge sublayer 120 may implement any number of additional or alternative guard band tracking mechanisms, such as through a dedicated register or other dedicated memory elements.

The DMLT MAC client 211 may control initiation and release of the guard band. In doing so, the DMLT MAC client 211 may signal a guard band initiation (to activate) or guard band release (to deactivate) to the MAC merge sublayer 120. A guard band initiation message from the DMLT MAC client 211 may cause the MAC merge sublayer 120 to assert the hold_req parameter, thus initiating a guard band. The guard band release message may cause the MAC merge sublayer 120 to release the hold_req parameter and thus release the guard band.

In the example shown in FIG. 2, the DMLT MAC client 211 tunnels a guard band communication through the MAC sub-layer to the MAC merge sublayer 120. As shown in the FIG. 2, the device 100 may implement a first request primitive (e.g., a "MA_MM.request" primitive) for interfacing the DMLT MAC client 211 to the DMLT MAC control 212 and a second request primitive (e.g., a "PLS_MM.request") primitive for interfacing the DMLT MAC logic 213 to the MAC merge sublayer 120. In some implementations, these primitives may not affect the operation of the DMLT MAC control 212 and the DMLT MAC logic 213, except to send the primitive on to a lower level interface and thus allowing the DMLT MAC client 211 to tunnel guard band initiation or release messages to the MAC merge sublayer 120. As another implementation option, the DMLT MAC client 211 may communicate a guard band initiation or release message directly to the MAC merge sublayer 120, e.g., via a direct communication link.

Figure 3:
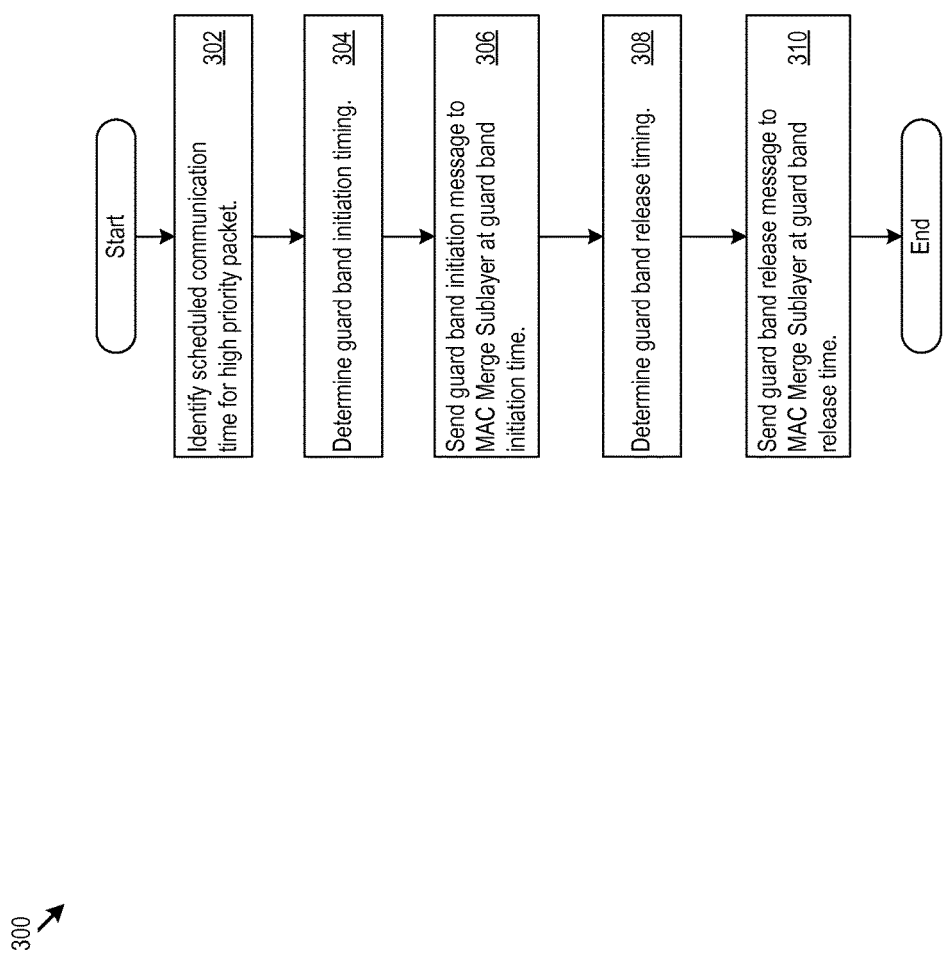
FIG. 3 shows an example of logic for supporting a guard band for high priority data.

FIG. 3 shows an example of logic 300 for supporting a guard band for high priority data. The device 100 may implement the logic 300 through any combination of hardware, software, or firmware. For example, a MAC client of the device 100 (e.g., the DMLT MAC client 211) may implement the 300 logic to support a guard band for communicating high priority data through the device 100.

The MAC client may identify a scheduled communication time for a high priority data (302), which may include one or more high priority packets. The scheduled communication time may specify a reception time or transmission time for the high priority packet by the device 100 or a particular element of the device 100, such a scheduled transmission time through a communication interface of the device 100 or a scheduled transmission time by the MAC merge sublayer 120 of a device 100. In some implementations, the MAC client determines a scheduled time when the high priority packet is to be processed/transmitted by the MAC merge sublayer 120 or through the PHY layer 130. The MAC client may access a communication schedule for the scheduled packets, which may include a periodic communication schedule of DMLT packets, such as sensor readings in a control system designated as DMLT. The MAC client may identify a scheduled communication time for a high priority packet that occurs in the future, and the MAC client may identify the scheduled communication time prior to even receiving the high priority packet.

The MAC client may determine a guard band initiation time (304). In doing so, the MAC client may identify a particular time prior to the scheduled communication time of the high priority packet that would support immediate processing and transmission of the high priority packet. The MAC client may account for any number of timing factors to ensure that the high priority packet can be, for example, immediately processed upon reception by the device 100. For example, the MAC client may determine packet or communication configurations, parameters, and/or requirements that may affect the timing of ensuring immediate processing of high priority data. Two timing factor examples the MAC client may account for are illustrated in FIG. 4 and discussed next.

Figure 4:
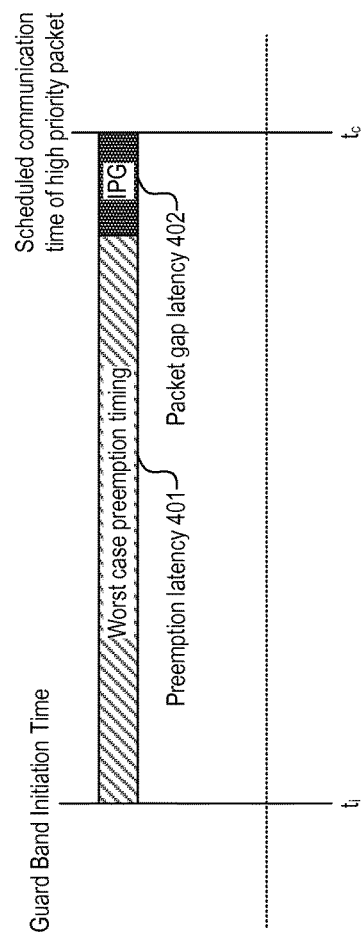
FIG. 4 shows an example of guard band initiation timing that MAC client may determine.

FIG. 4 illustrates an example of guard band initiation timing 400 that the device 100 may determine. In FIG. 4, the MAC client may identify time $t_c$ as a scheduled communication time for a high priority packet and determine time $t_i$ as a guard band initiation time occurring before $t_c$. In determining the guard band initiation time $t_i$, the MAC client may account for preemption latency 401, packet gap latency 402, or both.

The MAC client may determine the preemption latency 401 as an amount of time for the device 100 to preempt an in-progress communication of a low priority packet. As one example of preemption latency 401 shown in FIG. 4, the MAC client may account for a worst-case preemption timing which can occur for preempting a low priority packet. In this way, the MAC client may determine the preemption latency 401 to ensure that preemption of a low priority packet or sending of the remaining portion of a low priority packet will complete before the high priority packet is received by the device 100 or MAC merge sublayer 120 of the device 100. Some exemplary illustrations are presented next.

The MAC client may identify a worst-case preemption timing as the latency for sending a maximum-sized packet fragment of the low priority packet according to one or more preemption configuration parameters enforced by the MAC merge sublayer 120. To illustrate, the device 100 may support or enforce communication of a minimum fragment size (e.g., 64 bytes). The MAC merge sublayer 120 may prevent preemption that causes transmission of packet fragments of less than the minimum fragment size, for example by determining not to preempt when the result would be a packet fragment of less than the minimum fragment size. In the 64-byte minimum fragment example, a worst-case preemption timing scenario may result when the MAC merge sublayer 120 attempts to preempt a low priority packet after starting the transmission of a 127-byte packet or upon resuming transmission of a 127-byte fragment of a previously preempted low priority packet. These 127-byte packet or fragment scenarios may occur when the MAC merge sublayer 120 attempts to preempt after transmitting the preamble of the 127-byte packet or fragment.

In the scenario above, the MAC merge sublayer 120 may be unable to (or determine not to) preempt the 127-byte packet or the 127-byte fragment, as preemption would result in a packet fragment less than the minimum allowed fragment size of 64 bytes. Accordingly, the MAC client may identify the preemption latency 401 as the worst case latency for completing transmission of low priority data when attempting to preempt the low priority data. Thus, the MAC client may, as one example, determine the preemption latency 401 as the time required to transmit a maximum sized packet or fragment during a preemption attempt, e.g., the latency for transmitting 127 bytes of low priority packet data and accompanying preamble and/or fragment trailer data when preemption parameters specify enforcing a minimum fragment size of 64 bytes. The MAC client may determine the guard band initiation time to occur prior to the scheduled communication time by at least the preemption latency 401.

As another scenario regarding preemption latency 401, the MAC merge sublayer 120 may transmit and preempt low priority packet fragments without a minimum fragment size. In these scenarios, the MAC client may determine the preemption latency 401 as the latency for preempting transmission of the low priority packet, which may include latency for interrupting the low priority packet transmission and/or transmitting additional fragment indication data that follows a packet fragment. In this exemplary scenario, the MAC client may identify the preemption latency 401 as the latency for transmitting a fragment trailer that follows the packet fragment of the preempted low priority packet, such as the latency for generating and transmitting a fragment trailer that specifies a fragment number, provide a preemption indication of a non-final packet fragment, specify fragment integrity data (e.g., a cyclic redundancy check (CRC) value), or other data.

As yet another scenario, the MAC client may determine the preemption latency 401 as including any combination of latency for: (i) sending a maximum sized packet fragment and accompanying preamble data that could result during a preemption attempt (e.g., 127-byte packet and preamble for a 64-byte minimum fragment size); (ii) sending a fragment trailer; (iii) any other latency associated with preempting the lower priority packet. As discussed above, the MAC client may determine the guard band initiation time $t_i$ to occur prior to the scheduled communication time $t_c$ by at least the latency specified by preemption latency 401. In this way, the MAC client may initiate the guard band to ensure the MAC merge sublayer 120 completes preemption or transmission of an in-progress low priority packet before the scheduled high priority packet is to be transmitted. Thus, the MAC client may support a reduced latency or immediate transmission of scheduled high priority data.

Continuing discussion of timing factors that the MAC client may account for when determining a guard band initiation time (304), FIG. 4 illustrates a packet gap latency 402 that the MAC client may account for. The MAC client may determine the packet gap latency 402 as any specified timing between transmission of packets, e.g., as specified according to a particular communication protocol, topology, or standard employed by the device 100. As one illustrative example, the Ethernet standard may specify a minimum idle period between transmission of Ethernet packets, as expressed through an interpacket gap (IPG), interframe spacing, or interframe gap value. The IPG value for Ethernet may be specified as 96 bit times (the time it takes to transmit 96 bits of raw data on the medium), and exemplary IPG values include 9.6 microseconds (µs) for 10 Mbit/s Ethernet, 0.96 µs for 100 Mbit/s Ethernet, 96 nanoseconds (ns) for 1 Gbit/s (Gigabit) Ethernet, 9.6 ns for 10 Gigabit Ethernet and 0.96/3.8 ns for 100/40 Gigabit Ethernet, respectively. The MAC client may account for the IPG when communicating Ethernet frames, and ensure that the IPG is satisfied before a scheduled communication time of high priority data.

The packet gap latency 402 may affect transmission timing of a high priority packet by the MAC merge sublayer 120, as the MAC merge sublayer 120 may delay transmission of the high priority packet until the IPG period has elapsed after transmission of a preempted low priority packet fragment. Accordingly, the MAC client may account for a packet gap latency 402 by initiating the guard band at $t_i$ to ensure the packet gap latency 402 is satisfied prior to a scheduled communication time $t_c$ for a high priority packet, e.g., as shown in FIG. 4. While FIG. 4 presents two exemplary timing factors through the preemption latency 401 and the packet gap latency 402, the MAC client may account for any number of additional or alternative timing factors when determining a guard band initiation time. For instance, the MAC client may ensure that the guard band is initiated in sufficient time to meet any device or communication protocol parameter, configuration, or other transmission timing factor to ensure the high priority packet can be immediately processed and transmitted at the scheduled communication time $t_c$.

Continuing the discussion of the logic 300 in FIG. 3, the MAC client may send a guard band initiation message to the MAC merge sublayer 120 (306). The MAC client may send the guard band initiation message at or prior to the determined guard band initiation time. In that regard, the MAC client may send the guard band initiation message to cause activation of the guard band at the guard band initiation time. The MAC client may tunnel the guard band initiation message through a MAC sub-layer to the MAC merge sublayer 120, such as through a MA_MM.request primitive and a PLS_MM.request as discussed above. As another option, the MAC client may send the guard band initiation message directly to the MAC merge sublayer 120 through a dedicated communication line linking the MAC client and the MAC merge sublayer 120.

The MAC client may deactivate the guard band. As such, the MAC client may determine guard band release timing (308) and send a guard band release message to the MAC merge sublayer 120 (310). The MAC client may determine the guard band release timing as a particular time at or after the scheduled communication time of high priority data, which may include one or multiple high priority packets communicated successively. In doing so, the MAC client may account for any number of timing factors in determining the guard band release timing. As examples, the MAC client may determine the release timing based on whether and/or when one or more scheduled high priority packets have been received, processed, or transmitted. In some implementations, the MAC client determines to release or deactivate the guard band when a scheduled high priority packet has been transmitted by the MAC merge sublayer 120, e.g. upon confirmation transmission through the MAC merge sublayer 120 has occurred.

As one particular example, the MAC client may identify a scheduled communication time for when the device 100 will receive, process, or transmit a series of multiple high priority packets, such as a series of DMLT packets. In this example, the MAC client may maintain the guard band until after a last packet in the multiple high priority packets has started transmission (e.g., started transmission in the MAC merge sublayer 120). In doing so, the MAC client may prevent transmission of low priority data in between transmission of the high priority packets in the series. Accordingly, the MAC client may determine the guard band release timing to occur after the last high priority packet in the series has started transmission.

As an additional or alternative option, the MAC client may determine the guard band release timing as a set time after the scheduled communication time of the high priority data or the guard band initiation time. Thus, the MAC client may activate the guard band for a specified amount of time, which may be independent of whether or when the high priority data was actually transmitted by the device 100 or MAC merge sublayer 120. Put another way, the MAC client may determine to release the guard band at the set release time regardless of whether the device 100 receives/processes/communicates the high priority data or not. As yet another option, the MAC client may determine the guard band release timing as (i) the reception and/or transmission of the high priority data when occurring before the set time; or (ii) the set time when reception and/or transmission of the high priority data does not occur before the set time. Upon determining the guard band release timing, the MAC client may send a guard band release message to the MAC merge sublayer 120 in a similar manner as sending the guard band initiation message.

Figure 5:
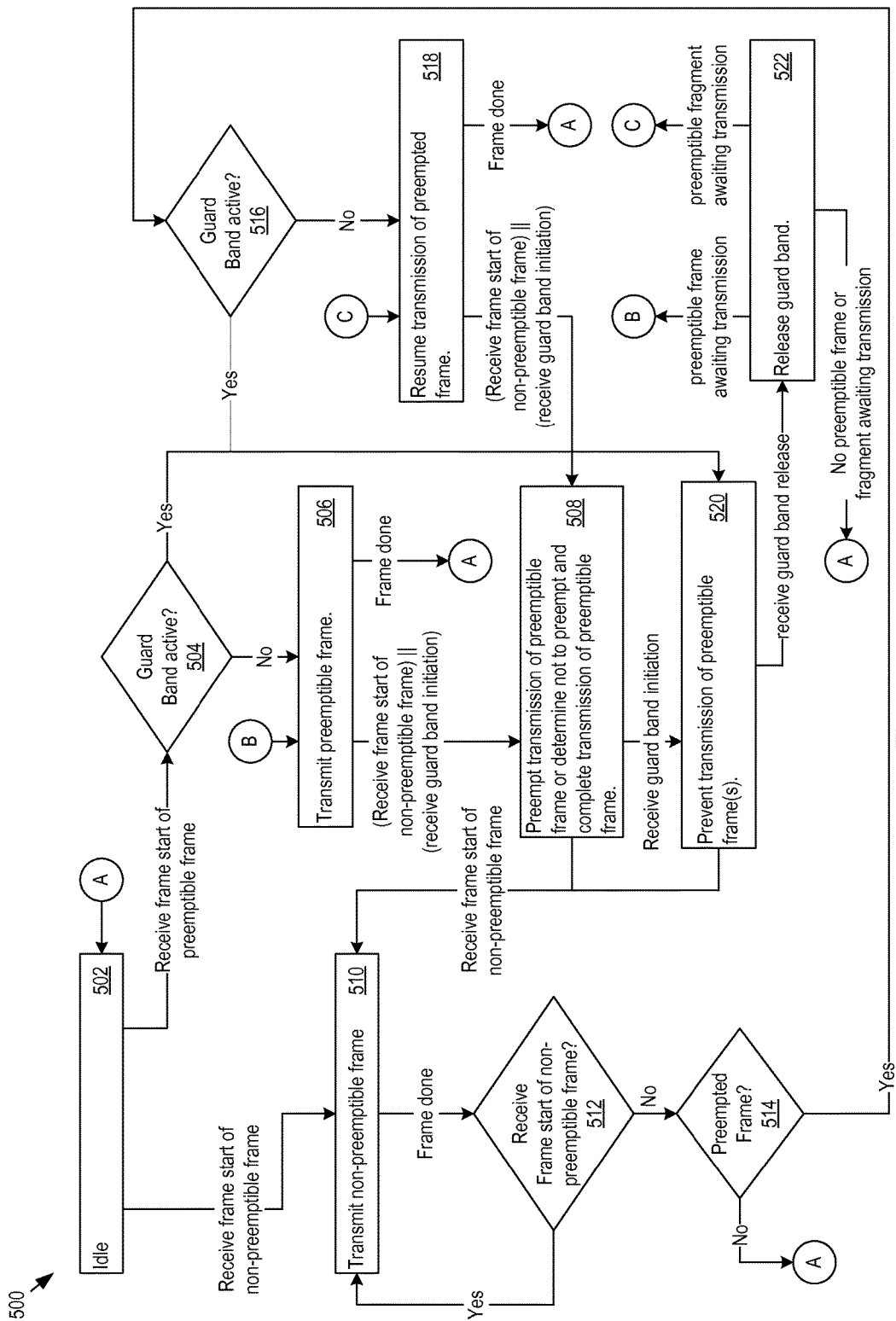
FIG. 5 shows another example of logic for supporting a guard band for high priority data.

FIG. 5 shows an example of logic 500 for supporting a guard band for high priority data. The device 100 may implement the logic 500 through any combination of hardware, software, or firmware. For example, the MAC merge sublayer 120 of the device 100 may implement the logic 500 to, among other features, support a guard band for communicating high priority data through the device 100. In some implementations, the MAC merge sublayer 120 implements the logic 500 as a state machine, which may take the form of dedicated circuitry 140. The logic 500 for supporting a guard band for high priority data may be combined with any of the encapsulation logic or techniques described in U.S. application Ser. No. 14/187,098. In the example shown in FIG. 5, the MAC merge sublayer 120 may identify a preemptible frame as low priority data and a non-preemptible frame as high priority data.

The MAC merge sublayer 120 may start or operate in an idle state (502), such as when the MAC merge sublayer 120 is not transmitting frame data to the PHY layer 130. Upon receiving a preemptible frame to transmit, the MAC merge sublayer 120 may determine whether a guard band is active (504), for example by reading the value of a hold_req parameter. When the guard band is not active, the MAC merge sublayer 120 may transmit the preemptible frame (506), e.g., on a bit-by-bit basis. The MAC merge sublayer 120 may continue to receive frame data of the preemptible data frame and transmit the preemptible frame on a bit-by-bit basis until completing transmission of the frame data or until determining to preempt transmission. When the MAC merge sublayer 120 completes transmission of the preemptible frame without interruption or preemption, the MAC merge sublayer 120 may return to an idle state (702).

The MAC merge sublayer 120 may determine to preempt transmission of the preemptible frame in response to receiving a frame start of a non-preemptible frame or upon initiating a guard band. The MAC merge sublayer 120 may receive the frame start of a non-preemptible frame from DMLT MAC logic 213, for example through a DMLT MAC PLS_DATA.request primitive. When the MAC merge sublayer 120 receives the frame start of a non-preemptible frame, the MAC merge sublayer 120 may preempt transmission of the preemptible frame (508), which may entail interrupting transmission of the preemptible frame, appending fragment trailer data, or performing any other preemption processes for interrupting transmission of the preemptible data frame. In some scenarios, the MAC merge sublayer 120 may attempt to preempt transmission of the preemptible frame, but determine not to preempt the preemptible frame (508), such as when preemption of the preemptible frame would violate a minimum-fragment size enforced by the device 100. In these scenarios, the MAC merge sublayer 120 may complete transmission of the preemptible frame instead of preempting the preemptible frame.

After preempting (or in some scenarios completing transmission of) the preemptible frame in response to receiving the frame start of a non-preemptible frame, the MAC merge sublayer 120 may transmit the non-preemptible frame (510).

The MAC merge sublayer 120 may complete transmission of the non-preemptible data frame, and determine whether a frame start for another (e.g., next or subsequent) non-preemptible data frame was received (512). If so, the MAC merge sublayer 120 may transmit the next or subsequent non-preemptible data frame (510). When the MAC merge sublayer 120 completes transmission of the non-preemptible data frame(s), the MAC merge sublayer 120 may determine whether a preempted frame is awaiting transmission (514). When the guard band is not active (516), the MAC merge sublayer 120 may resume transmission of the preempted frame (518) until completing transmission of a remaining fragment of the preemptible frame or until determining to preempt transmission.

Returning to preempting or completing transmission of the preemptible frame (508), the MAC merge sublayer 120 may preempt or complete transmission of the preemptible frame in response to activating a guard band. The MAC merge sublayer 120 may activate the guard band in response to receiving a guard band initiation message from the MAC client, including by asserting the hold_req parameter value. When the guard band is active, the MAC merge sublayer 120 may prevent or inhibit transmission of low priority data (520), including preventing transmission of preemptible frames or fragments. The MAC merge sublayer 120 may prevent the transmission of low priority data (e.g., the preemptible frame) even when the MAC merge sublayer 120 has yet to receive high priority data for transmission, e.g., prior to receiving the scheduled high priority data packet(s).

The MAC merge sublayer 120 may receive the high priority data for transmission through receiving a frame start of a non-preemptible frame, whereupon the MAC merge sublayer 120 may transmit the non-preemptible frame (510). Optionally, the MAC merge sublayer 120 may verify the frame start of the non-preemptible frame corresponds to the scheduled high priority data for which the guard band was initiated, for example by verifying any number of frame header values. In this option, the MAC merge sublayer 120 may additionally prevent transmission of other high priority data (e.g., non-scheduled high priority data) until the scheduled high priority data is received, processed, and transmitted.

Thus, the MAC merge sublayer 120 may preempt and prevent transmission of low priority data when the guard band is active. Upon releasing or deactivating the guard band, the MAC merge sublayer 120 may resume transmission of a preempted packet or other low priority data.

The MAC merge sublayer 120 may receive a guard band release message, and in response release the guard band (522). While FIG. 5 shows receiving the guard band release message at an exemplary point in the logic 500, the MAC merge sublayer 120 may release the guard band at various times or in various states within the logic 500. To deactivate the guard band and in response to receiving the guard band release message, the MAC merge sublayer 120 may clear the hold_req value or otherwise indicate release of the guard band. Upon releasing the guard band, the MAC merge sublayer 120 may allow transmission of low priority data, such as preemptible frames.

The actions taken by the MAC merge sublayer 120 after deactivating the guard band may vary depending on a current state or action of the MAC merge sublayer 120. When deactivating the guard band in an idle state without any pending data awaiting transmission, the MAC merge sublayer 120 may continue to remain in the idle state (502) until receiving a frame start of a data frame. When deactivating the guard band while transmitting a non-preemptible frame (510), the MAC merge sublayer 120 may complete transmission of the non-preemptible frame, and then determine whether a preemptible frame or fragmented preemptible frame is awaiting transmission by the MAC merge sublayer 120. This scenario is also illustrated when the MAC merge sublayer 120 receives the frame start of a preemptible frame and transmits the preemptible frame when the guard band in inactive (504 and 506).

Upon releasing the guard band and when no high priority (e.g., non-preemptible) data has been received for transmission or is presently being transmitted, the MAC merge sublayer 120 may resume transmission of low priority data awaiting transmission, such as a low priority frame fragment remaining from a previous preemption or an entire low priority frame previously inhibited from transmission due to the guard band. When a preemptible frame is awaiting transmission (e.g., when the MAC merge sublayer 120 receives a frame start of a preemptible frame after activating the guard band), the MAC merge sublayer 120 may transmit the preemptible frame (506) after releasing the guard band. When a fragment of a preemptible frame is awaiting transmission (e.g., when the MAC merge sublayer 120 previously preempted a preemptible frame when activating the guard band), the MAC merge sublayer 120 may resume transmission of the preempted frame (518) after releasing the guard band.

Accordingly, the MAC merge sublayer 120 may preempt transmission of low priority data when the guard band is active or when a DMTL MAC PLS_DATA.request interface to MAC logic indicates a high priority bit to transmit. The guard band provided by the device 100 may support reduced latency and/or immediate processing and transmission of scheduled high priority data received by the device 100. The device 100 may initiate the guard band even before the scheduled high priority data is received by the device 100 or the MAC merge sublayer 120 of the device. Upon receiving the scheduled high priority data, the MAC merge sublayer 120 may immediately transmit the high priority data without incurring additional latency for preempting a low priority packet.

Some or all of the devices in a communication system may provide a respective guard band. In that regard, the devices may respectively implement a MAC client and MAC merge sublayer 120. Each respective device may have a particular communication schedule for when high priority data is to be transmitted through the particular device. Accordingly, the devices may each activate a guard band according to the communication schedule as the high priority data traverses the network, e.g., initiating of respective guard bands at cascading times as the high priority data is scheduled for communication across the devices. In this way, a communication system with multiple MAC merge sublayers 120 and respective guard bands may collectively reduce the latency for transmitting high priority data, resulting in increased transmit speeds of high priority data, such as DMLT, across the system.

The device 100 may implemented as part of a communication network, and function in a temporary network or permanent network. For example, the device 100 may implement a guard band or transmit high priority data indefinitely. The communication network may include multiple devices 100 that respectively support communication of high priority data, e.g., through preemption or implementation of a any of the guard band features discussed herein. In some implementations, the communication network with the device 100 is implemented within or part of a machine, such as manufacturing equipment, an actuator, or a vehicle. The communication network and device 100 may be engineered or implemented as a permanent part of the machine, e.g., the communication schedule for the high priority data (e.g., DMLT) is developed and configured when the machine is designed. In these implementations, the communication schedule of the high priority data may be predetermined when the machine implementing the device 100 is designed. In other implementations, the device 100 may provide a guard band for high priority data as part of a temporary network or for temporary traffic where reservations for a schedule are made in real-time.

The methods, devices, processing, and logic described above (e.g., the DMLT MAC client 211, the MAC merge sublayer 120, and the dedicated circuitry 140) may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   a communication interface configured to transmit a first packet;
   a media access client (MAC) client circuitry configured to:
   identify, from a predetermined communication schedule, a scheduled future time to send the first packet through the communication interface; and
   determine a guard band initiation time to activate a guard band for high priority data, the guard band initiation time being prior to the scheduled future time, wherein the guard band initiation time accounts for a worst-case latency in preempting in-progress transmission of a packet with lower priority than the first packet;
   send a guard band initiation notification at the guard band initiation time;
   send a guard band release notification a predetermined time after the guard band initiation time; and
   MAC merge sublayer circuitry configured to:
   receive the guard band initiation notification via a dedicated communication line directly linking the MAC merge sublayer circuitry and the MAC client circuitry, and in response:
   initiate the guard band for transmittal of the first packet to ensure that no packet with lower priority than the first packet is being transmitted through the communication interface at the scheduled future time;
   receive the guard band release notification, and in response release the guard band,
   wherein the MAC client circuitry is configured to determine an amount of time between the guard band initiation time and the scheduled future time by taking into account an inter packet gap time.

2. The device of claim 1, wherein the MAC client circuitry is configured to identify the scheduled future time to send the first packet prior to the device receiving the first packet.

3. The device of claim 1, wherein the MAC merge sublayer circuitry is configured to initiate the guard band, after receipt of the guard band initiation notification, by:
   determination that a second packet with lower priority than the first packet is being transmitted through the communication interface; and
   preemption of transmission of the second packet prior to the scheduled future time.

4. The device of claim 1, wherein the MAC client circuitry is configured to determine the guard band initiation time to further account for a latency in sending a fragment trailer.

5. The device of claim 1, wherein the MAC client circuitry is configured to send the guard band release notification even if the first packet is not received by the device.

6. The device of claim 1, wherein the MAC merge sublayer circuitry is further configured to release the guard band by allowing transmission of a packet with lower priority than the first packet.

7. The device of claim 1, wherein the first packet comprises distinguished minimum latency traffic (DMLT).

8. A method comprising:
   in a network device:
   identifying, in a media access client (MAC) client of the network device and prior to receiving a first packet, a scheduled communication time for communication of the first packet by the network device;
   communicating a guard band activation message from the MAC client to a MAC merge sublayer of the network device via a dedicated communication line directly linking the MAC client and the MAC merge sublayer;
   activating, by the MAC merge sublayer, a guard band at a guard band initiation time, which accounts for worst-case latency in preempting in-progress transmission of a packet with a priority lower than the first packet, prior to the scheduled communication time;
   determining, by the MAC client, an amount of time between the guard band initiation time and the scheduled communication time by taking into account an inter packet gap time
   when the guard band is active, preventing transmission of data with lower priority than the first packet; and
   releasing the guard band a predetermined time after the guard band initiation time.

9. The method of claim 8, wherein preventing the transmission of the data with lower priority than the first packet comprises:
   preempting transmission of an in-progress second packet with lower priority than the first packet prior to receipt of the first packet.

10. The method of claim 8, further comprising determining the guard band initiation time as an amount of time prior to the scheduling communication time by accounting for a preemption parameter.

11. The method of claim 10, wherein the preemption parameter comprises a minimum packet fragment size for a preempted lower priority packet.

12. The method of claim 8, wherein releasing the guard band includes deactivating the guard band to allow transmission of lower priority packets after transmission of the first packet has occurred.

13. The method of claim 12, wherein releasing comprises releasing the guard band even when the first packet is not received by the network device.

14. The method of claim 8, wherein the first packet comprises distinguished minimum latency traffic (DMLT).

15. A device comprising:
   a communication interface; and
   guard band circuitry including at least a media access client (MAC) and a MAC merge sublayer, and being in communication with the communication interface, the guard band circuitry configured to:
   identify, in the MAC client and prior to receipt by the communication interface of a first packet, a scheduled communication time for communication of the first packet by the communication interface;
   determine, in the MAC client, a guard band initiation time for initiation of a guard band mode, which accounts for worst-case latency in preempting in-progress transmission of a packet with a priority lower than the first packet, prior to the scheduled communication time and prior to receipt of the first packet;
   communicate a guard band initiation message from the MAC client to the MAC merge sublayer via a dedicated communication link directly linking the MAC client and the MAC merge sublayer;
   determine, in the MAC client, an amount of time between the guard band initiation time and the scheduled communication time by taking into account an inter packet gap time;
   at the guard band initiation time and by the MAC merge sublayer, prevent transmission of data with lower priority than the first packet; and
   release the guard band a predetermined time after the guard band initiation time.

16. The device of claim 15, wherein the guard band circuitry is configured to prevent the transmission of the data by preempting in-progress transmission of a second packet with lower priority than the first packet.

17. The device of claim 15, wherein the guard band circuitry is configured to prevent the transmission of the data with lower priority than the first packet until at least the scheduled communication time.

18. The device of claim 15, wherein the guard band circuitry is further configured to identify the scheduled communication time from a predetermined communication schedule.

19. The method of claim 8, wherein identifying, prior to receiving the first packet, the scheduled communication time for communication of the first packet by the network device comprises accessing a predetermined communication schedule to identify the scheduled communication time.

20. The method of claim 8, wherein activating the guard band at the guard band initiation time prior to the scheduled communication time comprises activating the guard band prior to receipt of the first packet.

* * * * *